(12) United States Patent
Oh et al.

(10) Patent No.: US 9,451,817 B2
(45) Date of Patent: Sep. 27, 2016

(54) ACCESSORY MOUNT WITH FRICTION HINGE PLATE

(71) Applicants: Kwang J. Oh, La Crescenta, CA (US); Loren Oh, Irvine, CA (US); Austin Oh, Azusa, CA (US); Heidi Oh, La Crescenta, CA (US)

(72) Inventors: Kwang J. Oh, La Crescenta, CA (US); Loren Oh, Irvine, CA (US); Austin Oh, Azusa, CA (US); Heidi Oh, La Crescenta, CA (US)

( * ) Notice: Subject to any disclaimer, the term of this patent is extended or adjusted under 35 U.S.C. 154(b) by 0 days.

(21) Appl. No.: 14/981,739

(22) Filed: Dec. 28, 2015

(65) Prior Publication Data

US 2016/0249718 A1    Sep. 1, 2016

Related U.S. Application Data

(60) Provisional application No. 62/121,894, filed on Feb. 27, 2015, provisional application No. 62/165,864, filed on May 22, 2015.

(51) Int. Cl.
*H04M 1/00* (2006.01)
*A45C 11/00* (2006.01)
*A45F 5/00* (2006.01)

(52) U.S. Cl.
CPC ............... *A45C 11/00* (2013.01); *A45F 5/00* (2013.01); *A45C 2011/002* (2013.01)

(58) Field of Classification Search
CPC ... A45C 11/10; A45C 2011/002; A45F 5/00; H04M 1/0206; H04M 1/0214; H04M 1/0216; H04M 1/0218; H04M 1/0225; H04M 1/0227; H04M 1/0237; H04M 1/0239; H04M 1/0241; H04M 1/0254; G06F 1/1626
USPC ............................................ 455/575.1, 575.8
See application file for complete search history.

(56) References Cited

U.S. PATENT DOCUMENTS

| | | | | |
|---|---|---|---|---|
| 5,555,302 A * | 9/1996 | Wang | ................... | B60R 11/0241 |
| | | | | 379/426 |
| 5,568,549 A * | 10/1996 | Wang | ................... | B60R 11/0241 |
| | | | | 379/426 |
| 5,833,100 A * | 11/1998 | Kim | ......................... | A45F 5/02 |
| | | | | 224/197 |
| 5,979,724 A * | 11/1999 | Loewenthal, Jr. | .. | B60R 11/0241 |
| | | | | 224/483 |
| 6,006,969 A * | 12/1999 | Kim | ......................... | A45F 5/02 |
| | | | | 224/197 |
| 6,081,695 A * | 6/2000 | Wallace | .................... | A45F 5/02 |
| | | | | 24/3.11 |
| 6,328,271 B1 * | 12/2001 | Haage | ................. | B60R 11/0241 |
| | | | | 224/558 |
| 6,443,340 B1 * | 9/2002 | Chung | ..................... | A45F 5/02 |
| | | | | 224/197 |

(Continued)

*Primary Examiner* — Babar Sarwar
(74) *Attorney, Agent, or Firm* — John K. Park; Park Law Firm

(57) ABSTRACT

A holster system for a mobile device is provided, comprising a holster, a friction hinge plate, a fastener, and a grip bar. The holster is configured to hold a mobile device between the holster head portion and the one or more holder grips. The friction hinge plate comprises a top plate portion having a top screw hole, a bottom plate portion having a bottom screw hole, and a middle plate portion connecting the top and bottom plate portion, and the top plate portion and the bottom plate portion are disposed facing each other by elasticity of the middle plate portion. The fastener comprises a bolt screw configured to engage the top and bottom screw holes. The grip bar is disposed in the middle plate portion and configured to anchor an accessory.

15 Claims, 11 Drawing Sheets

(56) References Cited

U.S. PATENT DOCUMENTS

| | | | | |
|---|---|---|---|---|
| 6,633,770 B1* | 10/2003 | Gitzinger | A45F 5/00 | 224/191 |
| D499,092 S * | 11/2004 | Fan | D14/217 | |
| 7,540,459 B2* | 6/2009 | Asano | B60R 11/0241 | 248/309.1 |
| D710,363 S * | 8/2014 | Wengreen | D14/432 | |
| 2002/0104943 A1* | 8/2002 | Lehtonen | B60R 11/0241 | 248/300 |
| 2002/0139822 A1* | 10/2002 | Infanti | A45F 5/00 | 224/197 |
| 2003/0066856 A1* | 4/2003 | Lehtonen | A45F 5/02 | 224/675 |
| 2003/0106917 A1* | 6/2003 | Shetler | A45F 5/02 | 224/197 |
| 2004/0226836 A1* | 11/2004 | Schreiber | A45F 5/02 | 206/305 |
| 2006/0052064 A1* | 3/2006 | Goradesky | A45F 5/02 | 455/90.3 |
| 2006/0226039 A1* | 10/2006 | Goradesky | A45F 5/021 | 206/320 |
| 2006/0237494 A1* | 10/2006 | Fichera | A45F 5/02 | 224/197 |
| 2008/0191892 A1* | 8/2008 | Kirkup | G06F 1/1626 | 340/686.6 |
| 2011/0000945 A1* | 1/2011 | Mongan | A45F 5/02 | 224/581 |
| 2011/0073608 A1* | 3/2011 | Richardson | A45C 11/00 | 220/737 |
| 2012/0100398 A1* | 4/2012 | Lee | H01M 2/1066 | 429/7 |
| 2013/0105527 A1* | 5/2013 | Rekuc | A45C 15/00 | 224/183 |
| 2014/0084613 A1* | 3/2014 | Bullock | A45F 5/00 | 294/149 |

* cited by examiner

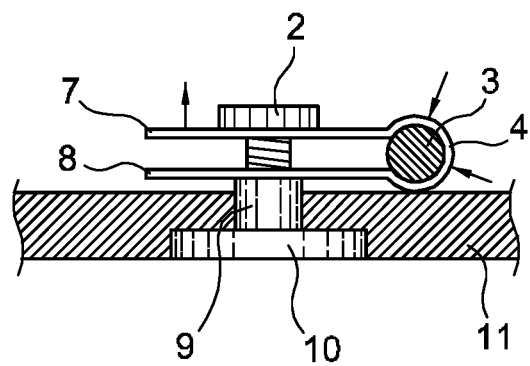
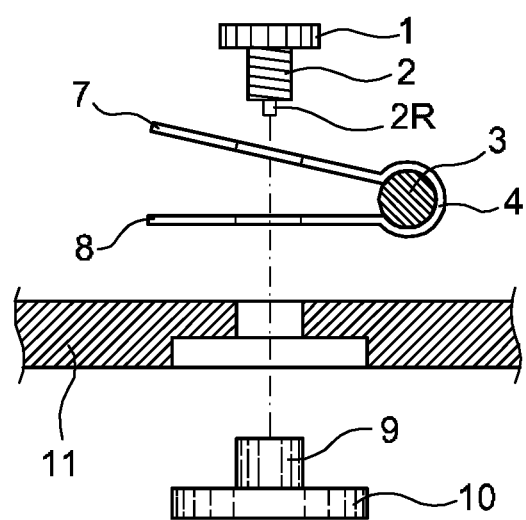

ACCESSORY MOUNT WITH FRICTION HINGE PLATE

RELATED APPLICATION

This application is a Non-provisional Application of Provisional Application Ser. Nos. 62/121,894 for "UNIVERSAL SMARTPHONE FIT DIRECTIONAL HOLSTER WITH BELT CLIP AND PLATE NUT FOR CAMERA STAND" filed on Feb. 27, 2015, and 62/165,864 for "FRICTIONAL SPRING PLATE WITH HINGE FOR SMARTPHONE ACCESSORY MOUNT" filed on May 22, 2015.

BACKGROUND OF THE INVENTION

The present invention relates to an accessory mount with a friction hinge plate or a friction hinge plate for smartphone accessory mount.

A need for a friction hinge plate for smartphone accessory mount has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a holster system for a mobile device, which includes an accessory mount with a friction hinge plate.

An aspect of the invention provides a holster system for a mobile device, comprising a holster, a friction hinge plate, a fastener, and a grip bar.

The holster comprises a holster body, a holster head portion disposed on a top edge of the holster body, and one or more holder grips connected with the holster body through one or more slide leg rails, and the holster is configured to hold a mobile device between the holster head portion and the one or more holder grips.

The friction hinge plate comprises a top plate portion having a top screw hole, a bottom plate portion having a bottom screw hole, and a middle plate portion connecting the top and bottom plate portion, and the top plate portion and the bottom plate portion are disposed facing each other by elasticity of the middle plate portion.

The fastener comprises a bolt screw configured to engage the top screw hole and the bottom screw hole and having a head portion, a screw portion disposed on an upper part of the bolt screw, and a rivet portion disposed on a bottom part of the bolt screw, and a screw holder configured to receive the rivet portion through the holster body and engage with the screw portion with the holster body sandwiched inbetween.

The grip bar is disposed in the middle plate portion and configured to anchor an accessory.

The holster head portion may have a shape of hook for holding an edge of the mobile device in place.

The holster head portion may comprise a sticky pad on an inner surface for facilitating to hold and grip the mobile device.

Each of the holder grip portions may have a shape of hook for holding an edge of the mobile device in place.

Each of the holder grip portions may comprise a sticky pad on an inner surface for facilitating to hold and grip the mobile device.

The middle plate portion of the friction hinge plate may have a cross-section of a portion or circle so as to hold the grip bar in place.

The screw holder may comprise a nut portion and a rivet portion. The nut portion is configured to engage the screw portion of the fastener, and the rivet holder portion extends from the nut portion and having a shape of disc.

The middle plate portion and the grip bar may be sized such that the grip bar rotates with easiness according to a degree of tightening of the fastener around the grip bar when the screw portion of the fastener is tightened to a specific position through the nut portion.

Each of the one or more slide leg rails may be connected to corresponding spring joint provided inside the holster body through corresponding spring.

The fastener may further comprise a friction tension handle knob fitted to the head portion of the bolt screw for controlling the degree of tightening.

The accessory may comprise a holster clip connected through the grip bar.

The holster clip may comprise a quarter inch universal nut hole configured to engage an external device having a quarter inch universal bolt.

The external device may comprise a camera stand, a selfie stick, and a suction cup.

The accessory may comprise a smartphone holder ring.

The smartphone holder ring may comprise a quarter inch universal nut hole configured to engage an external device having a quarter inch universal bolt.

The external device may comprise a camera stand, a selfie stick, and a suction cup.

The smartphone holder ring may further comprise a finger ring friction hinge grip rod, a ring friction hinge plate, an upper side ring friction hinge plate nut hole, and a lower side ring friction hinge plate hole.

The finger ring friction hinge grip rod is provided along a partial portion of the smartphone holder ring.

The ring friction hinge plate comprises an upper friction plate portion and a lower friction plate portion and configured for enclosing the finger ring friction hinge grip rod.

The upper side ring friction hinge plate nut hole is provided through the upper friction plate portion of the ring friction hinge plate.

The lower side ring friction hinge plate hole is provided through the lower friction plate portion of the ring friction hinge plate.

The upper side ring friction hinge plate nut hole and the lower side ring friction hinge plate hole are configured to engage another external device having a quarter inch universal bolt.

The accessory may comprise a suction cup configured for fixing the holster system on an external flat surface.

The advantages of the present invention are: (1) the holster system according to the invention provides a convenient holster, to which other accessory can be attached without removing the holster system; and (2) the holster system provides easy manipulation of the accessory by a large angle along at least two directions.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 3 is a cross-sectional side view of an assembled friction hinge plate of smartphone holster clip on body of holster according to an embodiment of the invention;

FIG. 4 is a cross-sectional exploded side view of a friction hinge plate according to an embodiment of the invention;

Figure 1:
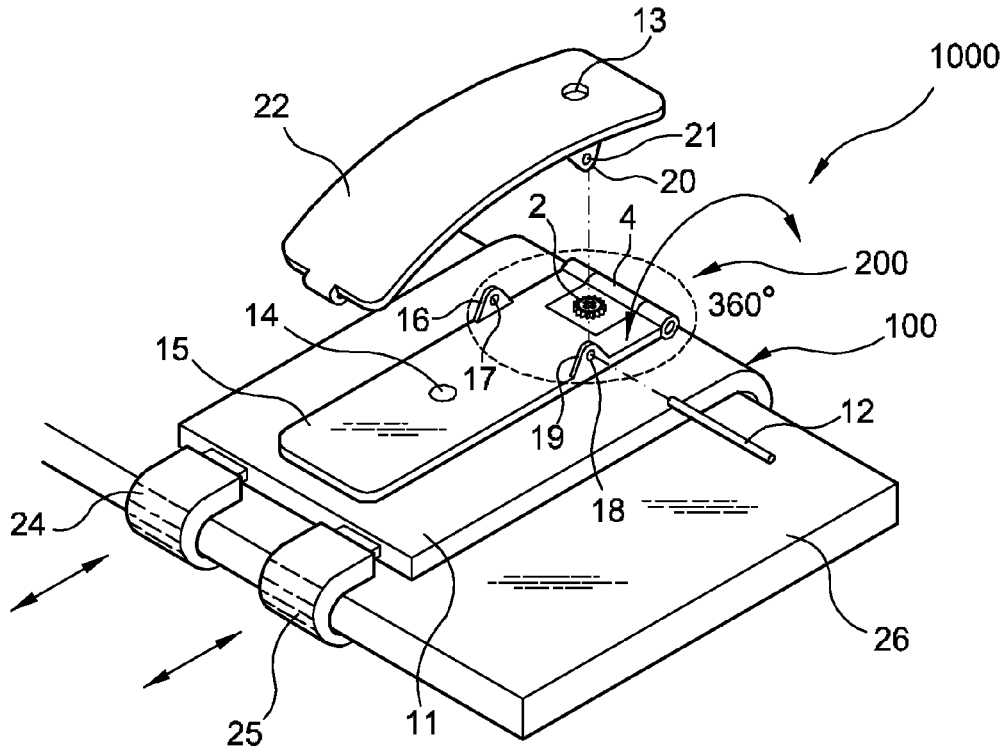
FIG. 1 is a perspective view of a friction hinge plate inserted on lower clip body of smartphone holster according to an embodiment of the invention.

REFERENCE NUMERALS 1 attachable and detachable friction tension handle knob
2 bolt screw
2C rivet receiver joint
2R rivet
3C clip grip bar
3R lower side finger ring friction hinge grip rod
3T upper side finger ring friction hinge grip rod
3X suction cup grip bar
4 friction plate nut body
5 upper hole for screw insertion
6 lower hole for screw insertion
7 upper plate of friction plate nut
8 lower plate of friction plate nut
9 nut for screw
10 rivet holder
11 holster body
11R right side holster body
11L left side holster body
12 rod pin for connecting upper and lower holster clip
13 ¼ inch nut hole for camera stand mount
14 magnet
15 lower body holster clip
15G rubber holder of slide prevent device
16 lower left holster clip connect hinge
17 hole for lower left holster clip connection
18 hole for lower right holster clip connection
19 lower right holster clip connection hinge
20 upper right holster clip connection hinge
21 upper right holster clip connection hinge hole
22 upper body holster clip
24 left side lower smartphone holder grip of smartphone holster
24E left side leg rail
25 right side lower smartphone holster grip of smartphone holster
25E right side leg rail
26 smartphone
27 ring
28 right side ¼ inch universal nut hole for camera stand or accessory mount
29 left side ¼ inch universal nut hole for camera stand or accessory mount
30 upper friction plate of upper side of smartphone holder ring
31 lower friction plate of upper side of smartphone holder ring
32 upper side ring friction hinge plate rod
33A upper side ring friction hinge plate nut hole
33B upper side ring friction hinge plate hole
35 ¼ inch universal bolt
36 camera stand bolt tightening controller
37 camera stand pole
38 tension plate spring
39 upper holster head for holding inserted smartphone
40 sticky pad
41R right lower side spring joint of smartphone holster
41L left lower side spring joint of smartphone holster
42R right upper side spring joint of smartphone holster
42L left upper side spring joint of smartphone holster
43R right side spring of smartphone holster
43L left side spring of smartphone holster
44 suction cup support body rod
45 suction cup
46 suction cup detach handle
47 slide prevent rubber insert
48 ¼ inch universal bolt

DETAILED DESCRIPTION EMBODIMENTS OF THE INVENTION

The U.S. Provisional Application Ser. Nos. 62/121,894 for "Universal Smartphone Fit Directional HOLSTER WITH BELT CLIP AND PLATE NUT FOR CAMERA STAND" filed on Feb. 27, 2015, and 62/165,864 for "FRICTIONAL SPRING PLATE WITH HINGE FOR SMART- PHONE ACCESSORY MOUNT" filed on May 22, 2015 are incorporated by reference herein for any and all purposes.

Most of the friction tension controller devices that is installed on camera stand or car mount devices to mount smartphone or mobile devices comes with combination of friction ball or tightening knob or plastic friction mold.

One of the issue with using the ball is they are either comes in big size and looks bulky which requires much space. Because of protrusion of balls and bulkiness, it is hard to carry it in pocket.

Another issue is camera stand mount or other digital mount device usually needs extra direction tightening angle controller with friction ball. Friction ball can freely move within certain boundary but it is limited to certain angle and cannot move in more wide angle. For that reason, it needs another angled controller to adjust in different angle.

Another issue of friction hinge but different material such as plastic friction device inserted on base of smartphone holder ring would wear out for frequent use and loose its tension.

Still other issue with mounting some devices on smartphone or digital devices are: when the users want to mount selfie stick or camera stand on the smartphone with finger ring device attached, since the ring is blocking the grabbing device, it is not easy to attach the grip/claw.

Another issue is when the finger ring device is attached on the back of the smartphone, since the attached pad has strong bonding, it will be very difficult to remove it. When one tries to detach the bonded pad, it will mostly leave bonding materials that is not easy to clean up. Furthermore, when one gives too much strength on pulling out the bonded pad, it can damage the body of smartphone.

Another issue is when the top of smartphone holder finger ring is decorated with jewels or accessories; they cannot easily change with other accessories unless they detach the whole finger ring device with other accessory mounted finger ring.

Most if not all cameras have a built-in universal size nut-hole for tripod or other stand to mount. Many people use their phones as their cameras though due to its design and limited size, it is to be inferred that consumers cannot expect the direct installation of the universal size nut any time soon in order to be used with tripods or other camera stands. Because the universal size bolt/nut are not directly connected to the cellular phone itself, certain limitations are present with camera-app companion products such as the 'selfie-stick'. This is why it is necessary to provide another device to grab and securely hold the cell phone.

A common issue of using the self-camera stick (as it is the most popular phone-camera companion) with cell phone holding device is the bulkiness. This, of course, makes handling/using the selfie-stick slightly awkward as the phone itself is also held away with bulkier 'claw-like' appendages or holds.

Another problem with most available 'selfie-stick'-like products is that the the cell phone holder needs extra space to carry. Once removed, the cell phone holder needs to be either put it into pocket or other bags which adds extra space for carrying.

In view of the above, there is a need for friction hinge and connection device that:

1. Does not wear out and prevent looseness in frequent use of device;
2. Simple one controller that tightens both perpendicular and vertical movement with wider angle control;
3. Device that is able to use all universal camera bolt size directly attached on side or back of smartphone holder device;
4. Friction controlled tightening device that would keep its tight friction to accomplish desired operation for long use;
5. Friction controlled device that can be interchangeable with other devices for more optios to use;
6. Finger ring device that can be easily attached or detached without leaving mess or marks on smartphone body or smartphone case;
7. Easy to change the accessories without detaching whole finger ring device from smartphone's body or smartphone's case body;
8. That is not bulky when self camera stick is attached to cell phone;
9. Removes unnecessary storage space for carrying.

The invention provides solutions to the problems of thickness of finger ring when mounted with selfie-stick.

Advantage of the present invention is to provide an interchangeable frictional plate hinge device to mount on smartphone or any other devices that needs frictional hinge operation with one friction joint controller.

Another advantage of the present invention is it does not wear out easily like other frictional hinge. The ball frictional hinges are used in camera stant or car moutand many other ways but it takes much space and angle of turning is limited to certain angle. And plastic molded frictional device is used on devices like smartphone holder ring to provide its tension for perpendicular movement of the ring. Frictional ball is too bulky and not easy to carry around and needs extra control knob for other directional movement, like perpendicular movement. And plastic molded device would easily wear out and lose its tension.

The frictional plate nut is made out of thin metal plates and bent in half. IN the center of upper and lower plates, a hole is provided. Then the opening part of the plates are inserted to hinge metal bar. After it is inserted, bolt screw is installed with rivet device holding the bottom of the device. After the set is installed, the frictional plates can be moved in 360 degrees angle along with screw bolt screw and also move perpendicular alongside with the hinge bar connection. With one bolt tightness, it creates both round and perpendicular movement while maintaining the strong tensions for long use.

Another advantage of the present invention is the friction plate hinge device can be applied in many different devices like smartphone holster clip, smartphone holder ring, suction cup devices, and many more devices with friction hinge required.

Another advantage of the present invention is on the same body of smartphone holster body, it can be replaced with other devices. From the holster body, holster clip part can be removed from frictional plate hinge and can be replaced other device like smartphone holder ring or suction cup. Thus, it provides an advantage of choosing an option that best fits for its usage purpose.

Another advantage of the present invention is on the top of holster clip or on the top of smartphone holder ring, there are ¼ inch universal nut hole are installed to mount camera stand, selfie stick or favorite jewels or accessories.

Another advantage of the present invention is because of using universal holster to fit on smartphone, it does not leave any mess or marks that comes from attached sticker pads of smartphone finger ring base panel when it is peeled off from the smartphone. On the top nut hole, it can be mounted with other accessories installed with ¼ inch universal bolt such as jewels, animal characters or other accessories. It's very convenient holster that can be fit in all different sizes of smartphones and it provides a many preference of choice to mount camera stand or accessories on the top of clip or finger ring devices.

On the top side of friction hinge plat nut of the finger ring, when the ¼ universal camera stand bolt or selfie bolt is inserted from lower frictional plate to upper frictional plate, it can be tightened by turning bolt knob in clockwise direction. When it is tightened, both plates will hold the ring rod tightly and hold the plates firmly thus giving firm friction support for selfie stick or camera stand use. Top center friction plate is connected with metal rod and swivels 360 degrees but when the nut is inserted and tightened on both plates, it will provide firm secure hold of mounted selfie stick or mounted accessory. Self stick or accessory can be mounted not only in the center friction plate nuts but also on both edges of nut mounted holes located on top of the ring.

When the bolt is inserted and tightened on top side of ring with center frictional plate nut, it will tightened the plate as secure hold base for selfie stick or camera stand. As it is tightened, the upper plate and lower plate will press and tightly and securely hold hinge connection rod (4) and bolt.

This applies in bottom finger ring frictional plat as well. When the top pin is pressed down and pass through upper and lower frictional plate and finger ring base support plate and tightened with rivet on the bottom, it will give firm and secure hold of frictional plate tension for tight hold of ring. The base frictional plate will make ring rod to swivel 180 degrees and the pin connected with rivet will rotate 360 degrees. Just like top ring frictional plate nut device, the bottom ring frictional plates are tightened by pin and rivet press that will provide firm movement and secure hold of ring to set the ring in desired angle.

On the bottom side friction hinge plate, it will be tightened by small handle knob that will control the friction strength of bottom side of ring. Bottom base friction hinge plate can rotate 360 degrees while attached ring will swivel 180 degrees.

The holder ring also works as kickstand when it is opened.

Another advantage of the present invention is that this will reduce extra accessories such as grabbing parts (claw) that are needed to hold the smartphone when one use selfie stick to take picture or video. It is compact size that will be convention to carry around, save space. Still another advantage of the present invention is to removes unnecessary storage space of cell phone holder/grabbing device. It will free you from carrying around extra components. Before or after use of the selfie stick for camera use, the holder/grabbing device needs to be removed from the stick and it needs to be placed either inside the pocket, bags or any other extra space. Often times, it is quite inconvenient. Often times, it is quite inconvenient to carry it around.

An aspect of the invention provides a holster system (1000) for a mobile device, comprising a holster (100), a friction hinge plate (200), a fastener (300), and a grip bar (400) as shown in FIGS. 1-5.

Figure 9A:
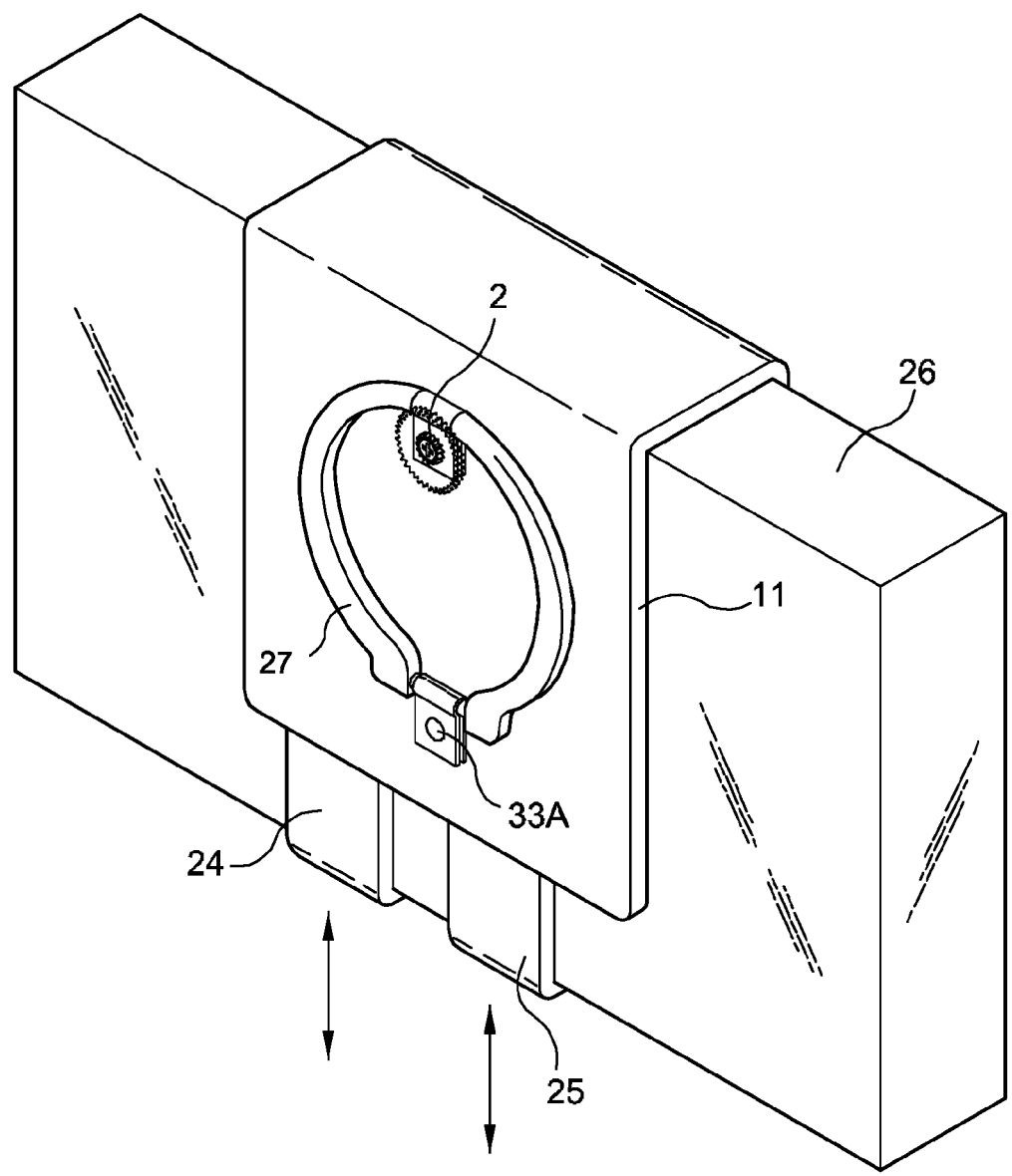
FIG. 9A is a perspective view showing smartphone holder ring inserted to friction hinge plate on top of smartphone holster body according to an embodiment of the invention.
Figure 9B:
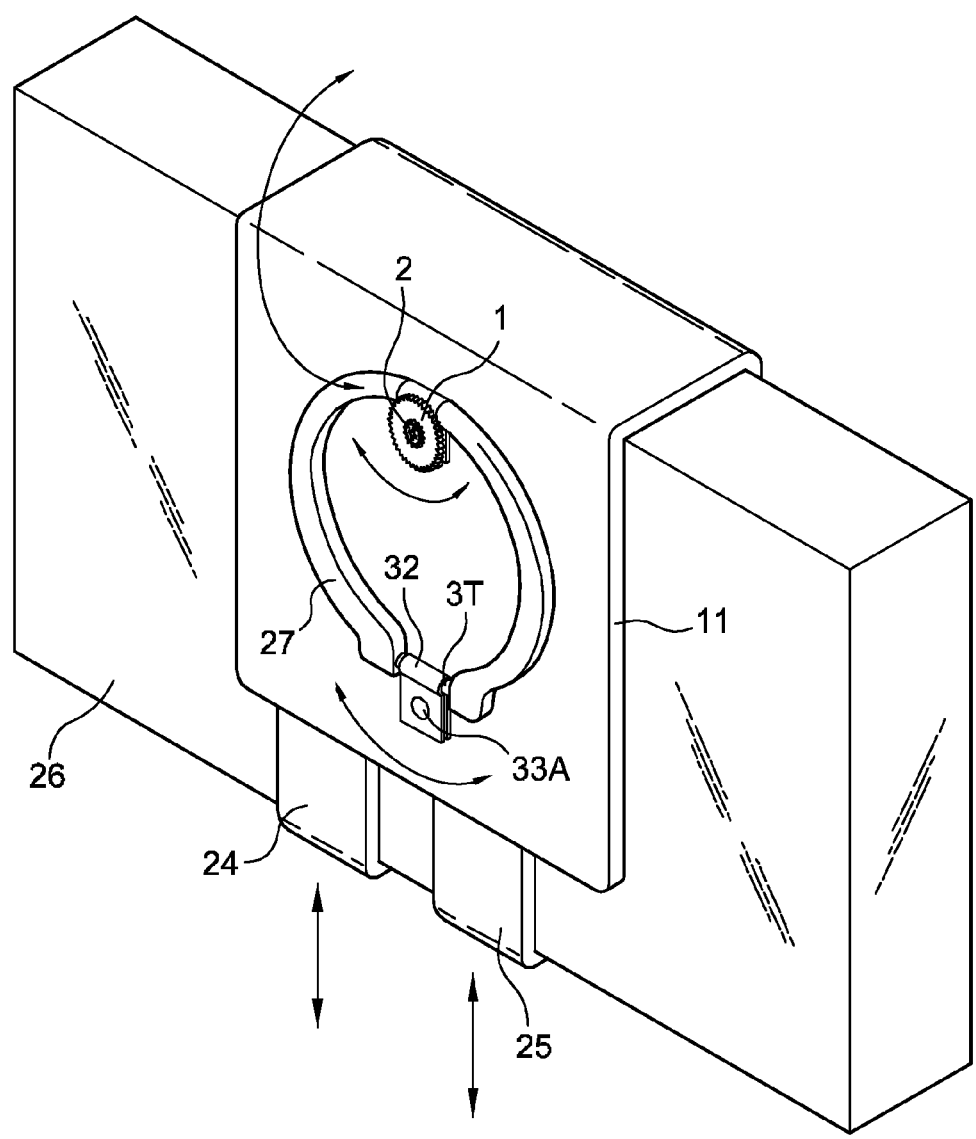
FIG. 9B is a perspective view showing another smartphone holder ring inserted to friction hinge plate on top of smartphone holster body according to an embodiment of the invention.

The holster (100) comprises a holster body (11), a holster head portion (39) disposed on a top edge of the holster body (11), and one or more holder grips (24, 25) connected with the holster body (11) through one or more slide leg rails (24E, 25E), and the holster (100) is configured to hold a mobile device (26) between the holster head portion (39) and the one or more holder grips (24, 25) as shown in FIGS. 1, 9A, and 9B.

The friction hinge plate (200) comprises an upper or top plate portion (7) having an upper or top screw hole (5), a lower or bottom plate portion (8) having a bottom screw hole (6), and a friction plate nut body or middle plate portion (4) connecting the top and bottom plate portions (7, 8), and the top plate portion (7) and the bottom plate portion (8) are disposed facing each other by elasticity of the middle plate portion (4).

The fastener (300) comprises a bolt screw (2) configured to engage the top screw hole (5) and the bottom screw hole (6) and having a head portion, a screw portion disposed on an upper part of the bolt screw, and a rivet portion (2R) disposed on a bottom part of the bolt screw (2), and a screw holder (9, 10) configured to receive the rivet portion (2R) through the holster body (11) and engage with the screw portion of the bolt screw (2) with the holster body (11) sandwiched inbetween. The screw holder (9, 10) includes a nut portion (9) for screw portion and a rivet holder (10) for receiving the rivet portion (2R).

The grip bar (400) is disposed in the middle plate portion (4) and configured to anchor an accessory (500).

Figure 6:
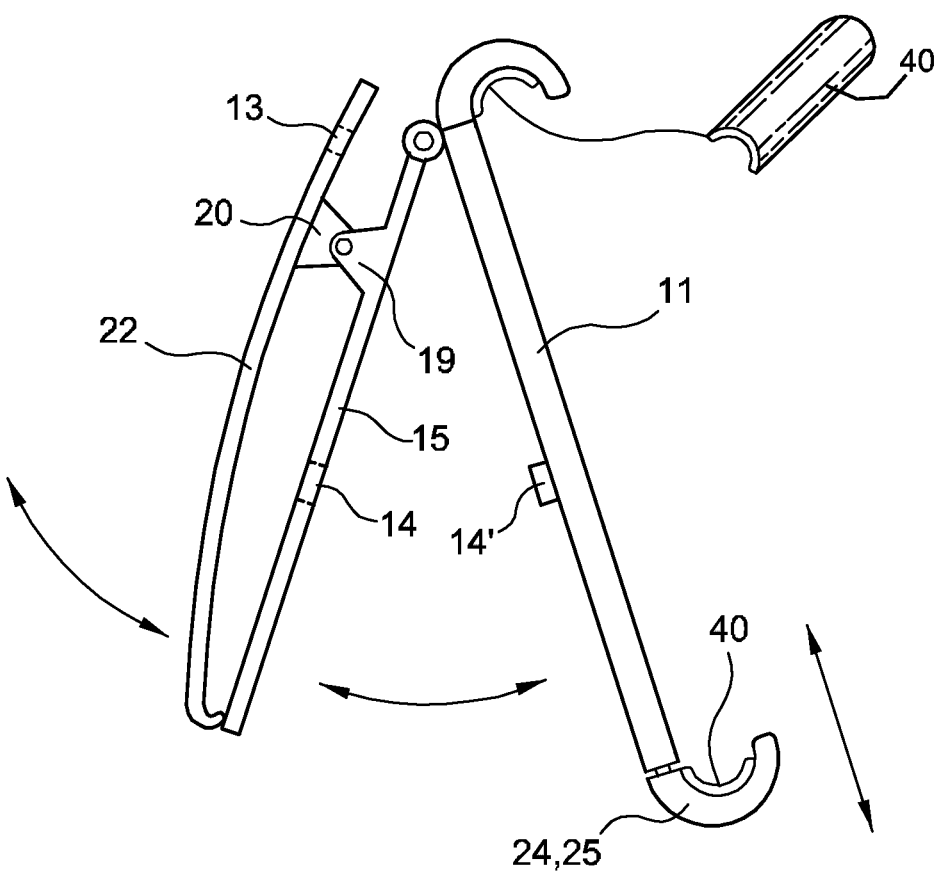
FIG. 6 is a side view of smartphone holster with friction hinge plate according to an embodiment of the invention.
Figure 7:
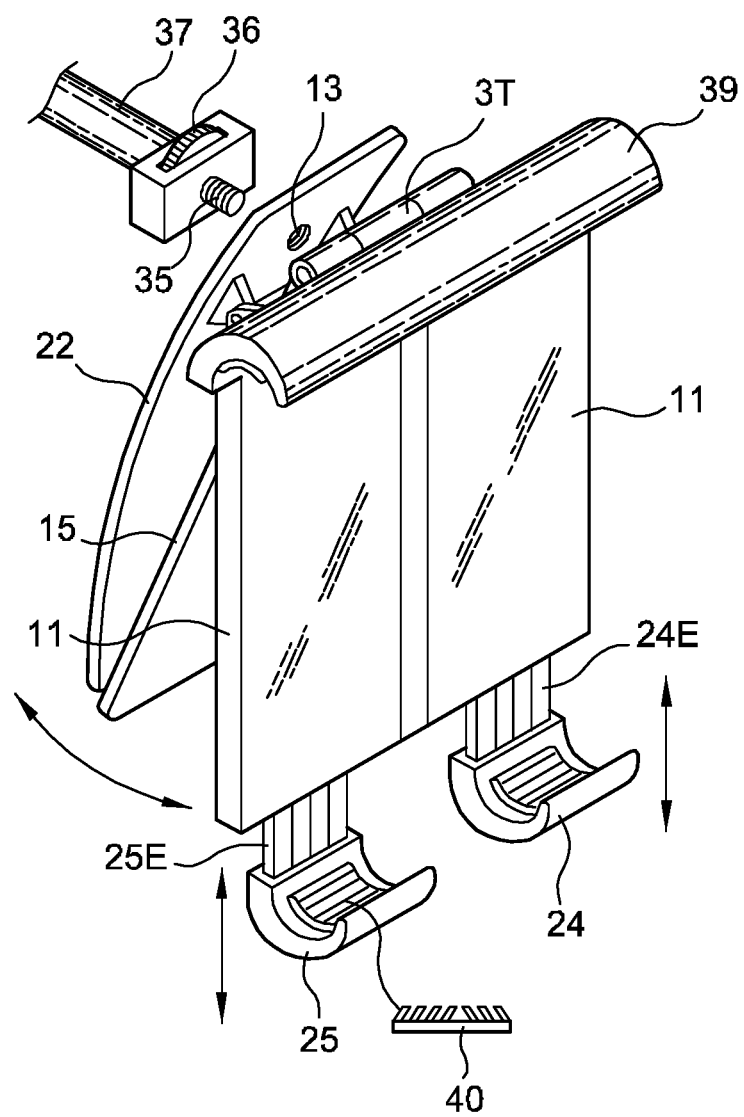
FIG. 7 is a perspective view of a front side of smartphone holster with friction hinge plate according to an embodiment of the invention.
Figure 8:
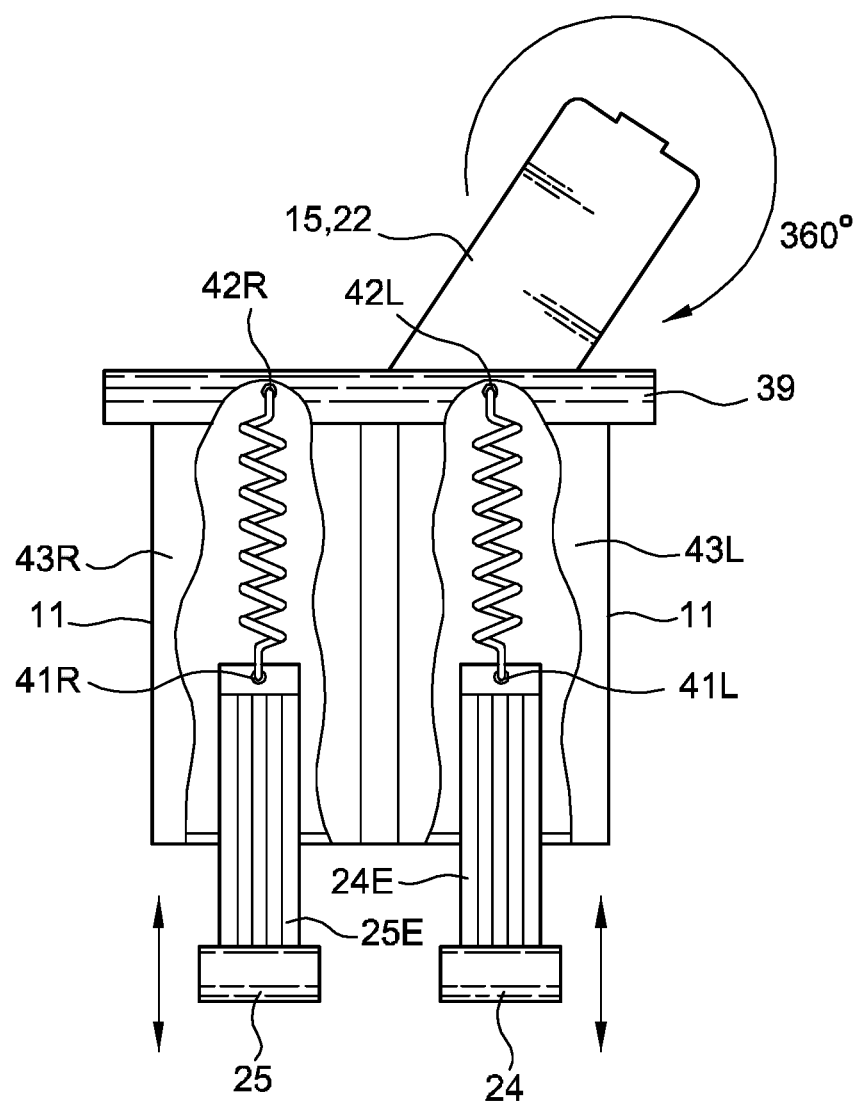
FIG. 8 is a partially cross-sectional view of a front side of smartphone holster with friction hinge plate according to an embodiment of the invention.

The holster head portion (39) may have a shape of hook for holding an edge of the mobile device (2) in place as shown in FIGS. 6-8.

The holster head portion (39) may comprise a sticky pad (40) on an inner surface for facilitating to hold and grip the mobile device (26) as shown in FIG. 6.

Each of the holder grip portions (24, 25) may have a shape of hook for holding an edge of the mobile device (26) in place as shown in FIGS. 1 and 6-8.

Figure 2:
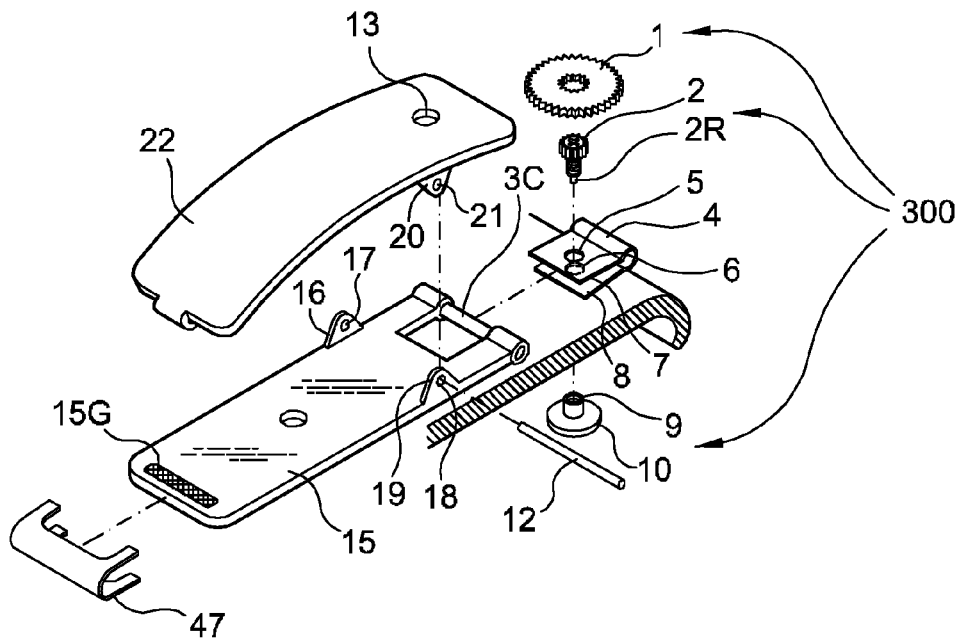
FIG. 2 is a perspective view of a friction hinge plate before assembled to holster clip according to an embodiment of the invention.
Figure 10:
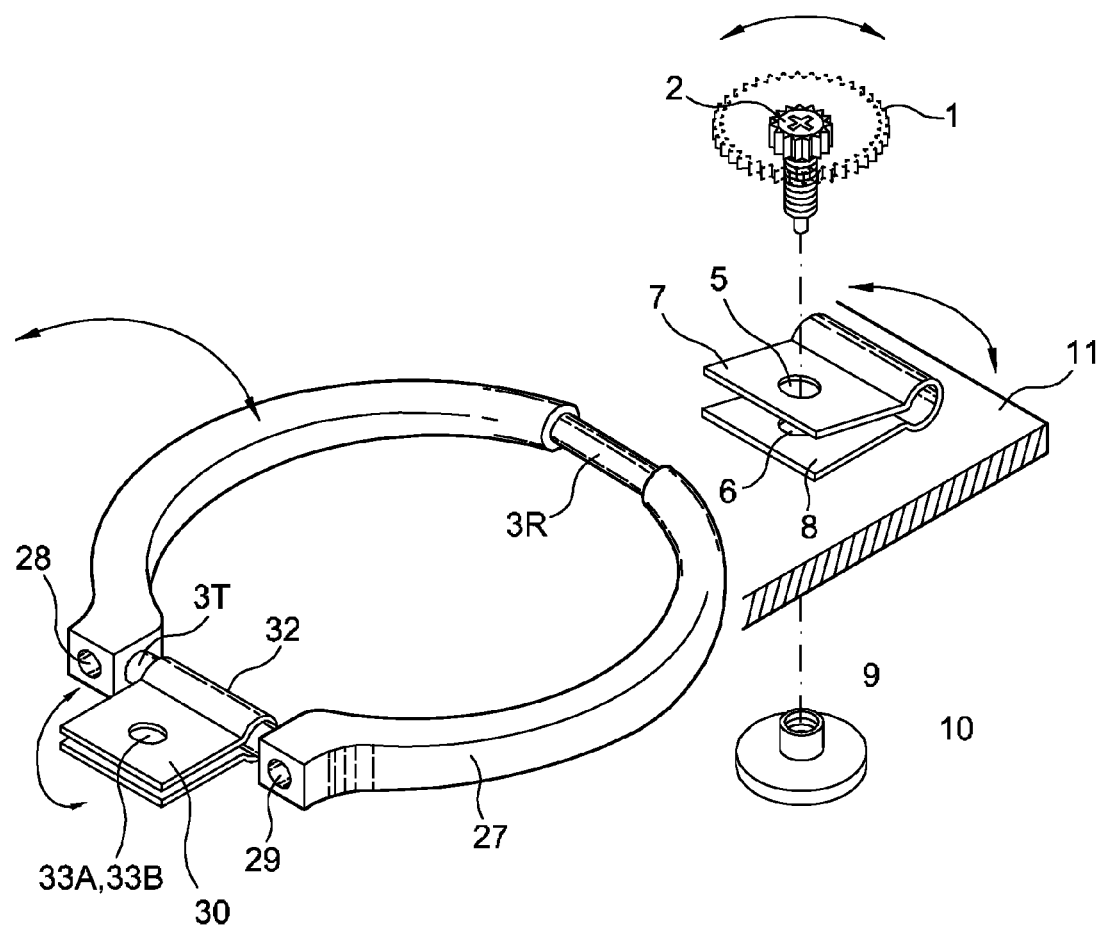
FIG. 10 is a perspective view showing how frictional plate ring is inserted to friction hinge plate according to an embodiment of the invention.
Figure 11:
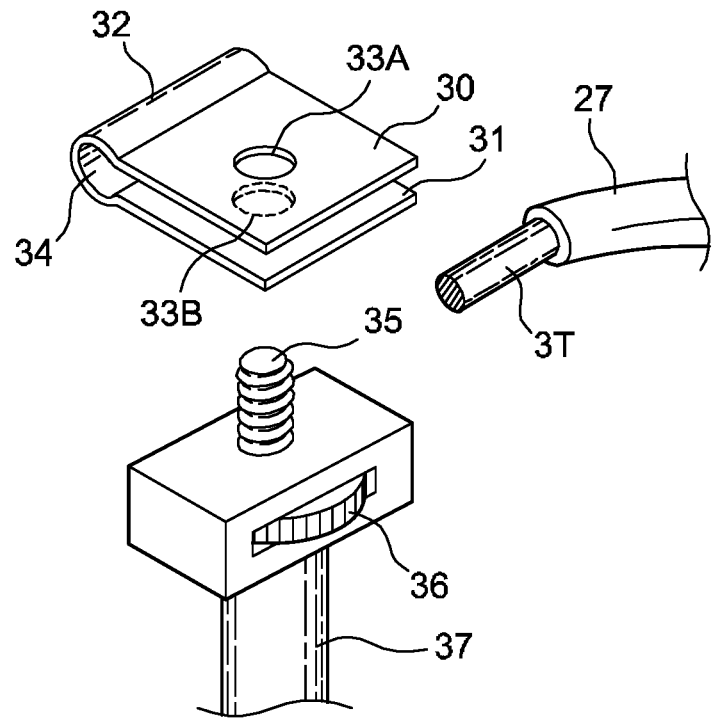
FIG. 11 is a perspective view of a top ring side of friction hinge plate before assembled according to an embodiment of the invention.
Figure 15:
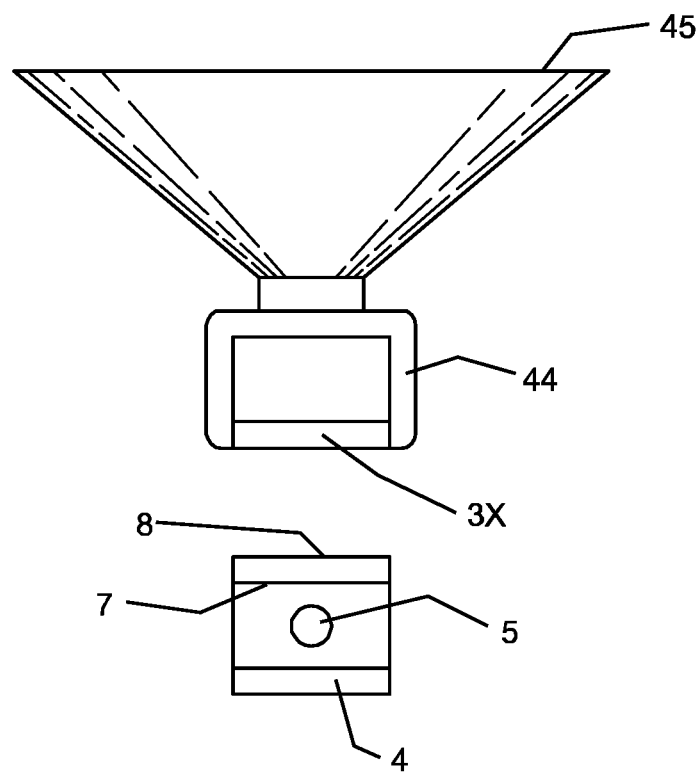
FIG. 15 is a side view of a suction cup with a frictional hinge rod device to be inserted to friction hinge plate device according to an embodiment of the invention.

The middle plate portion (represented by reference numeral 4) of the friction hinge plate (200) may have a cross-section of a portion or circle so as to hold the grip bar (400) in place. The grip bar (400) can be provided as a part of the accessory (500) as element (3T) as shown in FIGS. 2, 10, 15. However, in certain embodiments of the invention, the grip bar (400) can be provided separately from the accessory (500) and the separate grip bar (not shown) and the accessory (not shown) can be configured to engage each other fixedly. Still the operation of the grip bar (400) allowing the force of grip controlled by the fastening degree between the friction hinge plate (200) and the fastener (300).

As discussed in the above, the screw holder (9, 10) may comprise a nut portion (9) and a rivet holder portion (10). The nut portion (9) is configured to engage the screw portion of the fastener (300), and the rivet holder portion (10) extends from the nut portion (9) and has a shape of disc in the illustrated embodiment. However, the rivet portion or rivet holder portion (10) may have any shape, which can secure the screw holder in plate through the holster body (11) as shown in FIGS. 2-4.

The middle plate portion of the friction hinge portion (200) and the grip bar (400) may be sized such that the grip bar (400) rotates with easiness according to a degree of tightening of the fastener (300) around the grip bar (400) when the screw portion of the fastener (300) is tightened to a specific position through the nut portion (9).

Each of the one or more slide leg rails (24, 25) may be connected to corresponding spring joint (42R, 42L) provided inside the holster body (11) through corresponding spring (43R, 43L) as shown in FIG. 8.

The fastener (300) may further comprise a friction tension handle knob (1) fitted to the head portion of the bolt screw (2) for controlling the degree of tightening of the bolt screw (2) as shown in FIG. 2. As illustrated, the friction tension handle knob (1) can be provided detachably from the head portion of the bolt screw (2). In such a case, the outer edge of the head portion of the bolt screw (2) and the inner edge of the friction tension handle knob (1) can be provided with corresponding engaging means such as the sawtooth-shaped engaging surfaces. In other embodiment of the invention, the friction tension handle knob (1) and the bolt screw (2) may be integrated monolithically.

The accessory (500) may comprise a holster clip connected through the grip bar (400) as shown in FIGS. 1-6.

The holster clip (500) may comprise a quarter inch universal nut hole (13) configured to engage an external device such as a camera stand pole (37) having a quarter inch universal bolt (35) as shown in FIG. 7.

Figure 16:
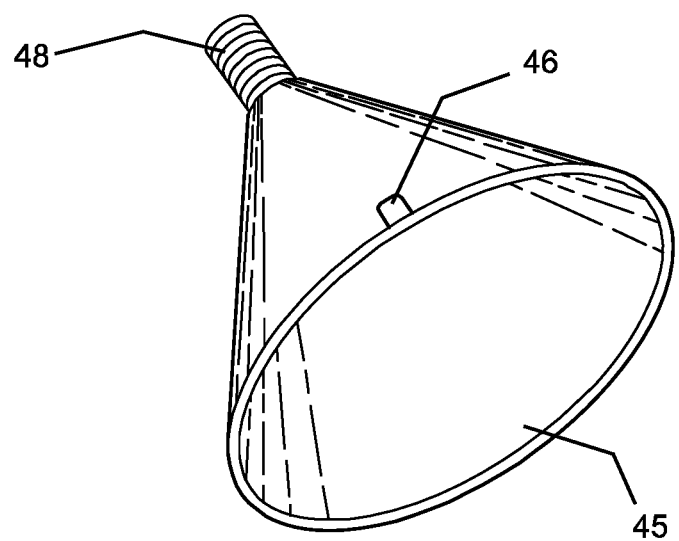
FIG. 16 is a perspective view of a suction cup installed with ¼ inch universal bolt to mount on top of friction hinge plate smartphone holder ring according to an embodiment of the invention.

The external device may comprise a camera stand (37), a selfie stick, and a suction cup (45) as shown in FIG. 16.

The accessory (500) may comprise a smartphone holder ring (27).

The smartphone holder ring (27) may comprise a quarter inch universal nut hole (28, 29), which is provided at an edge of the ring, and configured to engage an external device having a quarter inch universal bolt (35) as shown in FIGS. 9A-14. As in the case of the holster clip (500), the external device may comprise a camera stand (37), a selfie stick, and a suction cup (45).

The smartphone holder ring (27) may further comprise a finger ring friction hinge grip rod (3T), a ring friction hinge plate (30, 31, 32), an upper side ring friction hinge plate nut hole (33A), and a lower side ring friction hinge plate hole (33B).

The finger ring friction hinge grip rod (3T) is provided along a partial portion of the smartphone holder ring (27).

The ring friction hinge plate (30, 31, 32) comprises an upper friction plate portion (30) and a lower friction plate portion (31) and configured for enclosing the finger ring friction hinge grip rod (3T).

The upper side ring friction hinge plate nut hole (33A) is provided through the upper friction plate portion (30) of the ring friction hinge plate (32).

The lower side ring friction hinge plate hole (33B) is provided through the lower friction plate portion (31) of the ring friction hinge plate (32).

Figure 12:
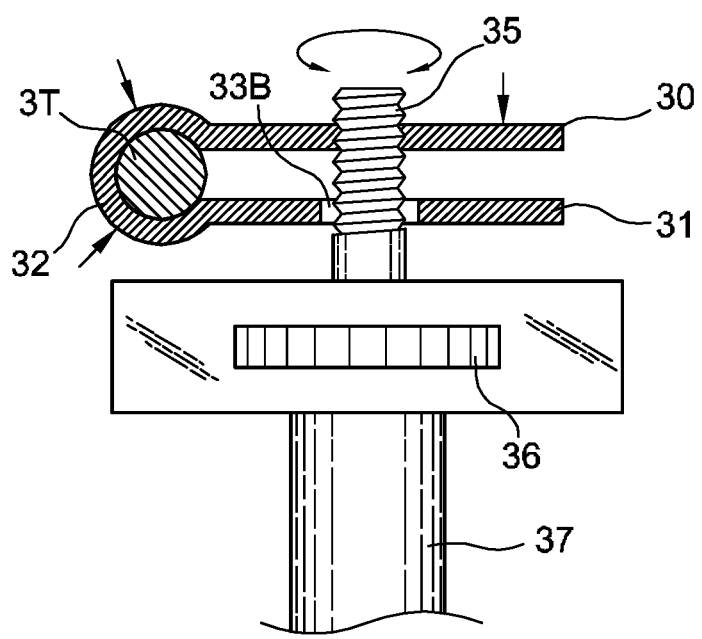
FIG. 12 is a cross-sectional side view of universal ¼ camera stand bolt inserted on top side of ring according to an embodiment of the invention.
Figure 13:
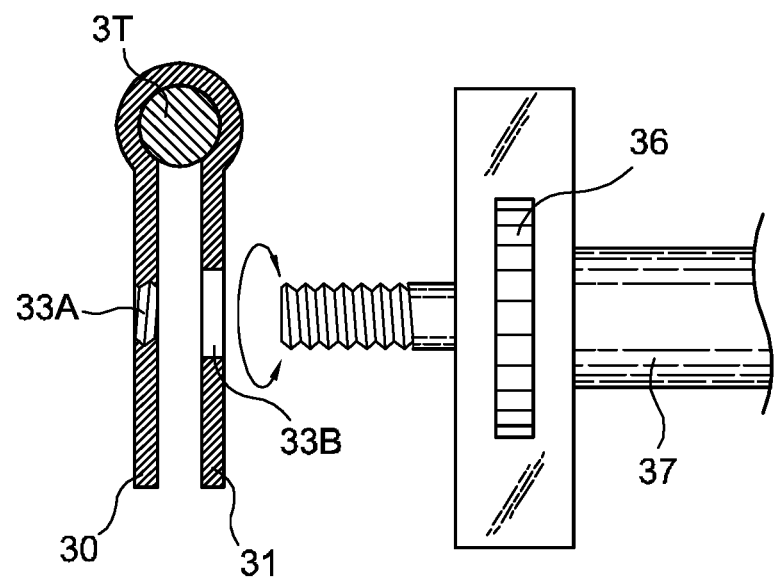
FIG. 13 is a cross-sectional view showing universal ¼ camera stand bolt before inserted on top side of ring according to an embodiment of the invention.

The upper side ring friction hinge plate nut hole (33A) and the lower side ring friction hinge plate hole (33B) are configured to engage another external device having a quarter inch universal bolt (35) as shown in FIGS. 12-13.

The accessory may comprise a suction cup (45) configured for fixing the holster system (1000) on an external flat surface, and the suction cup (45) may be attached directly to the friction hinge plate (200) as shown in FIG. 15 or through the quarter inch universal nut hole (13, 28, 29, 33A) and the quarter inch universal bolt (48) provided thereon.

Referring to FIG. 1, the magnet (14) is provided on the lower body holster clip (15) and configured to engage with another magnet (14') provided on the holster body (11) as shown in FIG. 6. The rod pin (12) connects the upper and lower body holster clips (15, 22) through elements (17-21).

Referring to FIG. 2, the friction tension handle knob (1) may be provided separately from the bolt screw (2), or alternatively, they can be provided integrally. A slide prevent rubber insert (47) may be installed at an end portion of the holster clip (15, 22).

Figure 5:
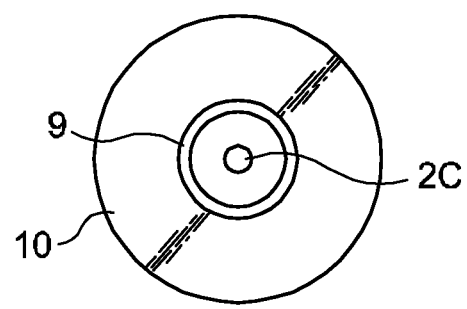
FIG. 5 is a top view of a nut hole with rivet receiver hole according to an embodiment of the invention.

Referring to FIGS. 3 to 5, the screw bolt (2) and the nut (9) and rivet holder (10) engage one another through the upper plate portion (7), tho lower plate portion (8), a hole bored through the holster body (11), and the gripping force and the degree of rotation about the clip grip bar (3) can be controlled thereby. As illustrated, the hole through the holster body (11) are formed so as to accommodate the nut (9) and the rivet holder (10), such that the friction hinge plate (200) can rotated by 360 degrees about the bolt screw (2). The rivet receiver joint (2C) is configured to be fit to the rivet (2R).

Referring to FIG. 6, the holster clip is used to clip or attach the smartphone to a belt of the user.

Referring to FIG. 7, the holster system of the invention enables the user to attach more that one accessory to the smartphone, the holster body (11), the holster clip (15, 22), and even the camera stand (37) altogether.

Referring to FIG. 8, the holster clip (15, 22) can be rotated by 360 degrees about the bolt screw (2).

Figure 14:
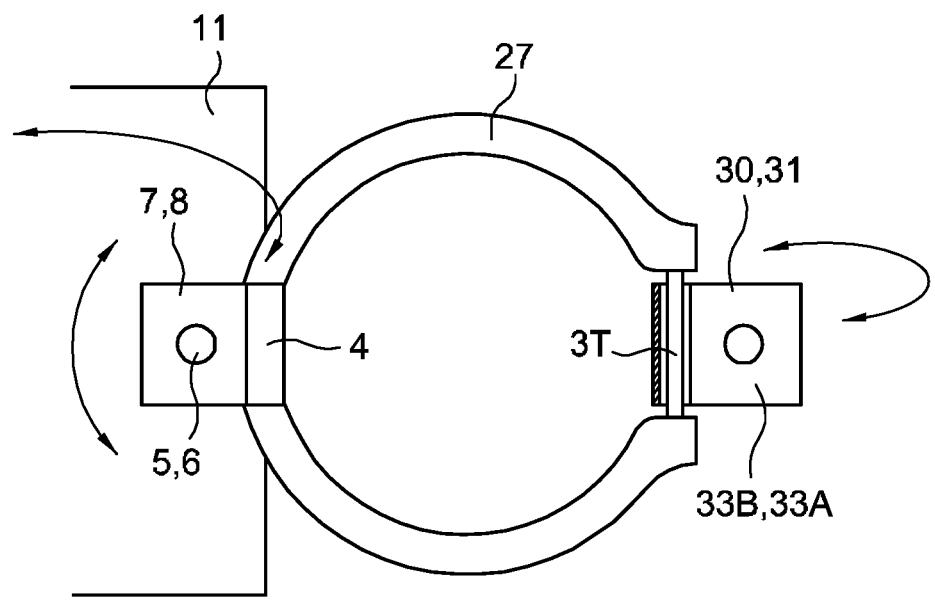
FIG. 14 is a partially cross-sectional top view of a friction hinge plate ring according to an embodiment of the invention.

Referring to FIGS. 9A and 9B and 10-14, the upper side friction hinge plate (32) is provided by engaging the ring (27) only. Then, the camera stand (37) or other accessory can be attached to holes (33A, 33B). The ring can be flipped by 180 degrees as shown in FIG. 14. The partial cross-sectional view of the upper side friction hinge plate is illustrated in FIG. 14.

Referring to FIG. 15, the suction cup 45 can be attached to the lower side friction hinge plate (4) through the support body rod (44).

Referring to FIG. 16, the suction cup (48) can be attached to one of the quarter inch universal nut hole.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A holster system for a mobile device comprising:
a holster comprising a holster body, a holster head portion disposed on a top edge of the holster body, and one or more holder grips connected with the holster body through one or more slide leg rails, wherein the holster is configured to hold the mobile device between the holster head portion and the one or more holder grips;
a friction hinge plate comprising a top plate portion having a top screw hole, a bottom plate portion having a bottom screw hole, and a middle plate portion connecting the top plate and bottom plate portion, wherein the top plate portion and the bottom plate portion are disposed facing each other by elasticity of the middle plate portion;
a fastener comprising a bolt screw configured to engage the top screw hole and the bottom screw hole and having a head portion, a screw portion disposed on an upper part of the bolt screw, and a rivet portion disposed on a bottom part of the bolt screw, and a screw holder configured to receive the rivet portion through the holster body and engage with the screw portion with the holster body sandwiched in-between; and
a grip bar disposed in the middle plate portion and configured to anchor an accessory,
wherein the accessory comprises a smartphone holder ring,
wherein the smartphone holder ring further comprises:
a finger ring friction hinge grip rod provided along a partial portion of the smartphone holder ring;
a ring friction hinge plate comprising an upper friction plate portion and a lower friction plate portion and configured for enclosing the finger ring friction hinge grip rod;
an upper side ring friction hinge plate nut hole provided through the upper friction plate portion of the ring friction hinge plate; and a lower side ring friction hinge plate hole provided through the lower friction plate portion of the ring friction hinge plate, wherein the upper side ring friction hinge plate nut hole and the lower side ring friction hinge plate hole are configured to engage another external device having a quarter inch universal bolt.

2. The holster system of claim 1, wherein the holster head portion has a shape of hook for holding an edge of the mobile device in place.

3. The holster system of claim 2, wherein the holster head portion comprises a sticky pad on an inner surface for facilitating to hold and grip the mobile device.

4. The holster system of claim 1, wherein each of the holder grip portions has a shape of hook for holding an edge of the mobile device in place.

5. The holster system of claim 4, wherein each of the holder grip portions comprises a sticky pad on an inner surface for facilitating to hold and grip the mobile device.

6. The holster system of claim 1, wherein the middle plate portion of the friction hinge plate has a cross-section of a portion or circle so as to hold the grip bar in place.

7. The holster system of claim 1, wherein the screw holder comprises:
   a nut portion configured to engage the screw portion of the fastener; and
   a rivet holder portion extending from the nut portion and having a shape of disc.

8. The holster system of claim 7, wherein the middle plate portion and the grip bar are sized such that the grip bar rotates with easiness according to a degree of tightening of the fastener around the grip bar when the screw portion of the fastener is tightened to a specific position through the nut portion.

9. The holster system of claim 1, wherein each of the one or more slide leg rails is connected to corresponding spring joint provided inside the holster body through corresponding spring.

10. The holster system of claim 1, wherein the fastener further comprises a friction tension handle knob fitted to the head portion of the bolt screw for controlling the degree of tightening.

11. The holster system of claim 1, wherein the accessory comprises a holster clip connected through the grip bar.

12. The holster system of claim 11, wherein the holster clip comprises a quarter inch universal nut hole configured to engage an external device having a quarter inch universal bolt.

13. The holster system of claim 12, wherein the external device comprises a camera stand, a selfie stick, and a suction cup.

14. The holster system of claim 1, wherein the external device comprises a camera stand, a selfie stick, and a suction cup.

15. The holster system of claim 1, wherein the accessory comprises a suction cup configured for fixing the holster system on an external flat surface.

* * * * *